United States Patent [19]

Takada

[11] 4,366,587
[45] Jan. 4, 1983

[54] INFANT SAFETY CARRIER FOR VEHICLES

[76] Inventor: Juichiro Takada, 3-12-1, Shinmachi Setagayaku, Tokyo, Japan

[21] Appl. No.: 166,813

[22] Filed: Jul. 8, 1980

[30] Foreign Application Priority Data

Jul. 9, 1979 [JP] Japan .................................. 54-085985

[51] Int. Cl.$^3$ .............................................. A47D 7/04
[52] U.S. Cl. .......................................... 5/94; 297/216
[58] Field of Search ....................... 5/94, 97, 413, 468; 297/216, 250, 465, 466

[56] References Cited

U.S. PATENT DOCUMENTS

| 369,605 | 9/1887 | Lucacs | 5/97 |
| 2,008,919 | 7/1935 | Milkes | 5/413 |
| 2,392,948 | 1/1946 | Reeves | 5/97 |
| 2,586,247 | 2/1952 | Mover | 5/97 |
| 2,883,678 | 4/1959 | Heffernan | 5/97 |
| 3,203,011 | 8/1965 | Faludi | 5/94 |
| 3,833,946 | 9/1974 | Von Wimmersperg | 5/94 |

Primary Examiner—Roy D. Frazier
Assistant Examiner—Michael F. Trettel
Attorney, Agent, or Firm—Brumbaugh, Graves, Donohue & Raymond

[57] ABSTRACT

An infant safety carrier for vehicles comprises a rigid receptacle that is secured by a vehicle seat belt on the seat crosswise of the vehicle and a bag of strong flexible material fastened to the receptacle and shaped and dimensioned to envelop an infant's body and head, except for his or her face, to restrain the infant safely in the vehicle in the event of an accident.

5 Claims, 26 Drawing Figures

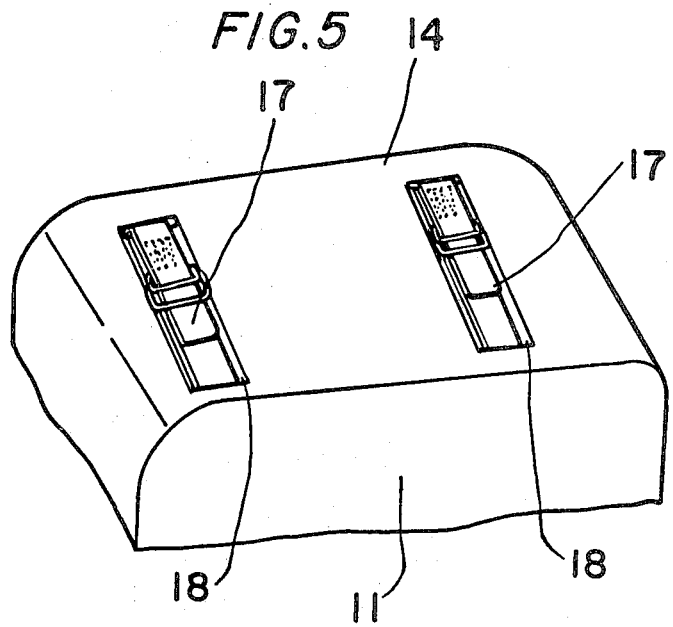
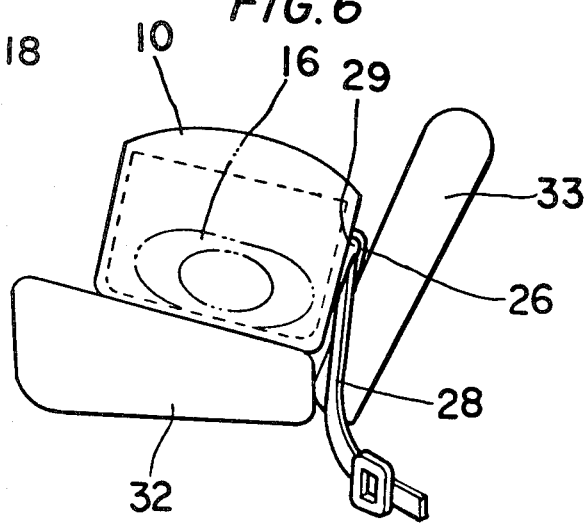
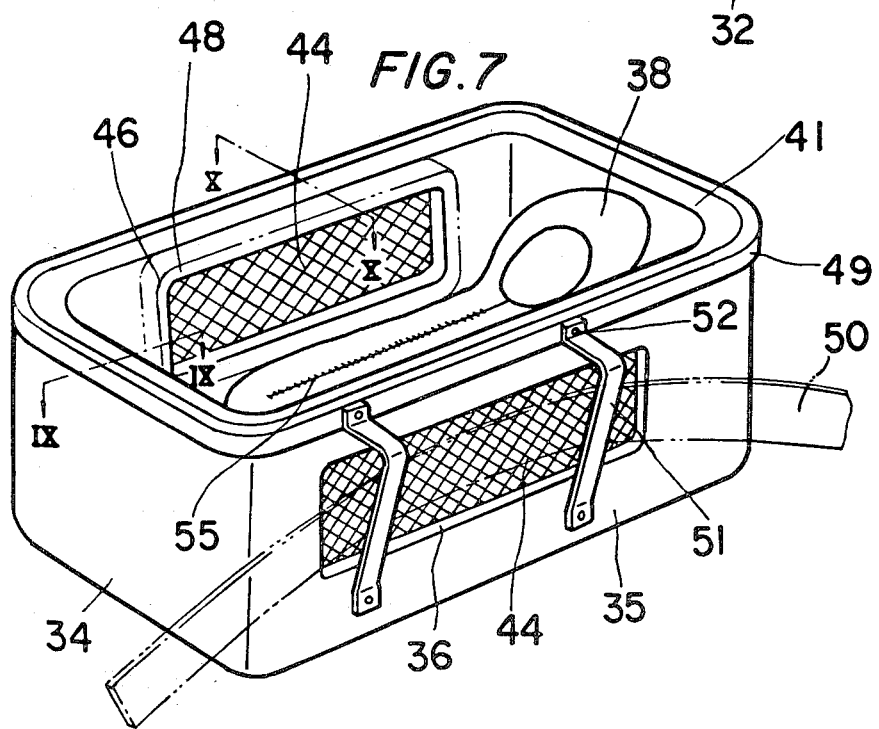

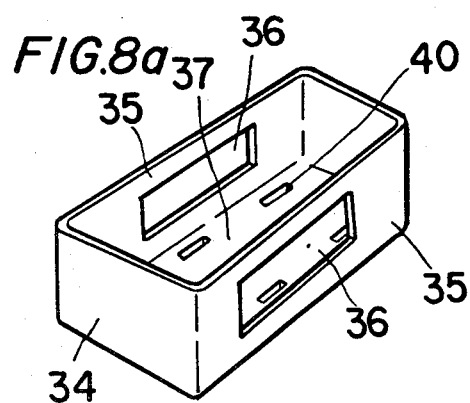
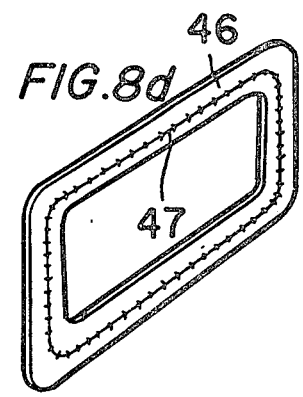
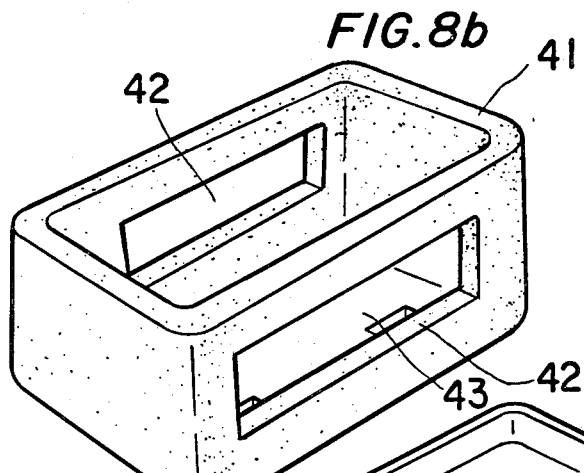
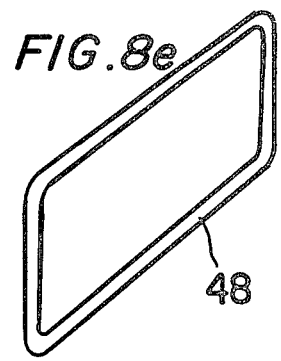
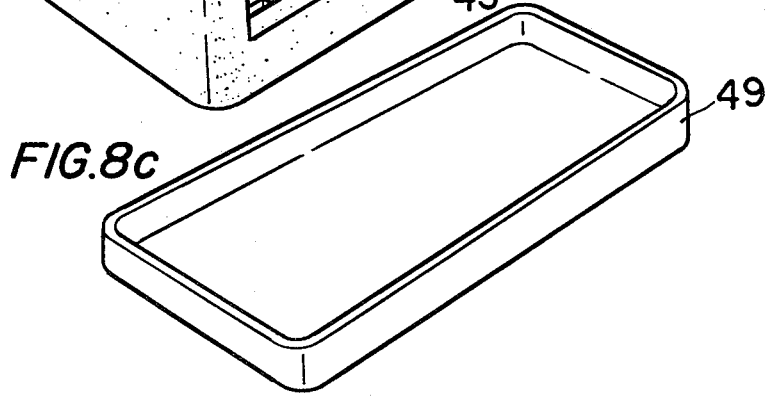
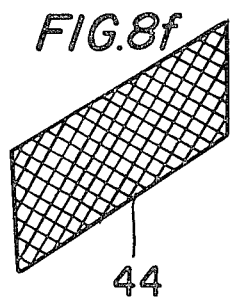
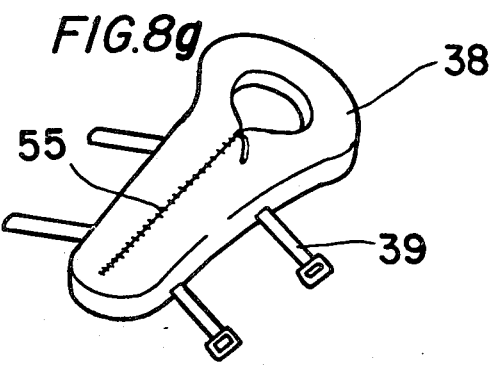
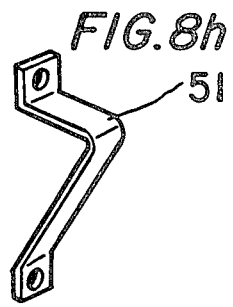

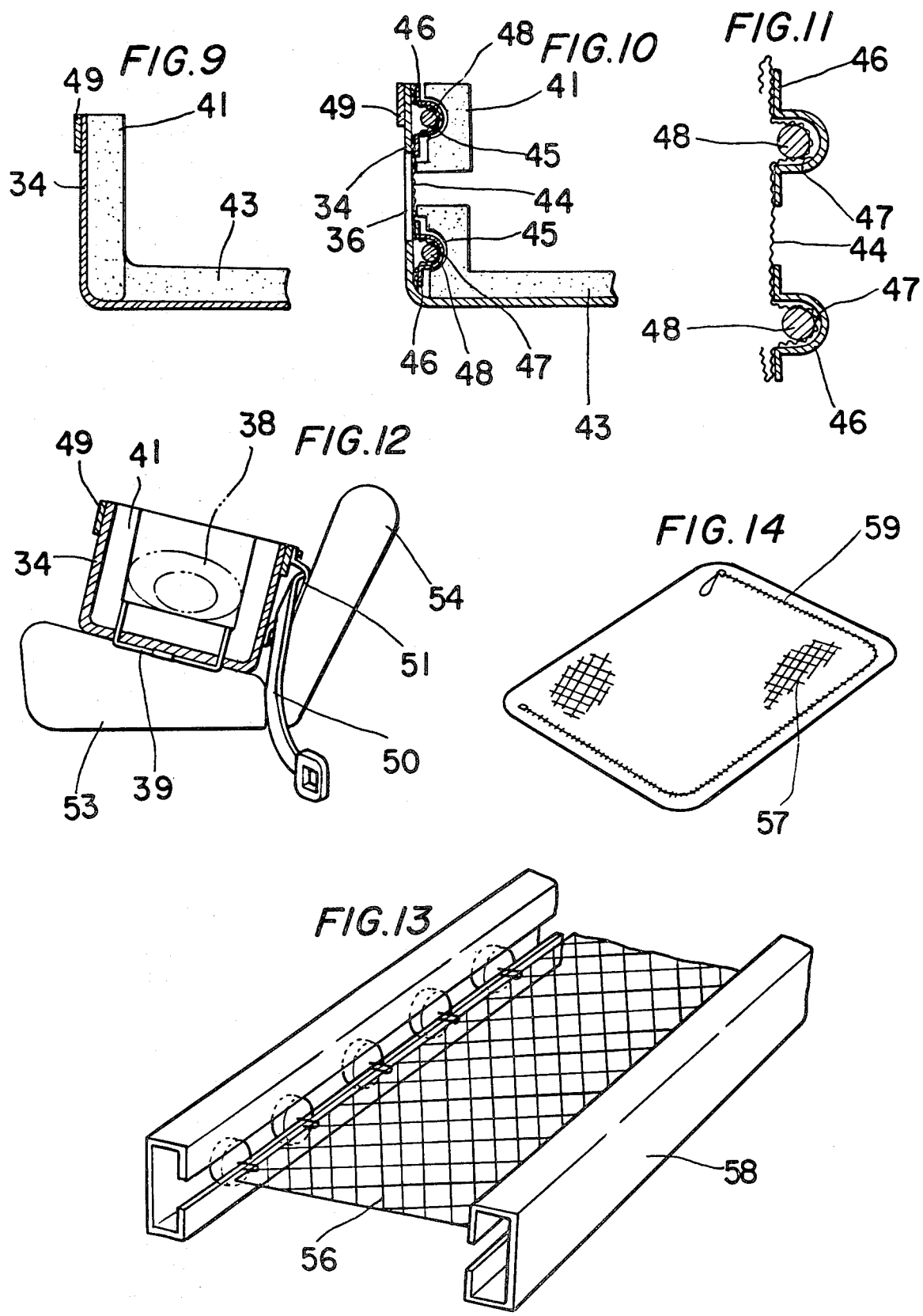

INFANT SAFETY CARRIER FOR VEHICLES

FIELD OF THE INVENTION

The present invention relates to an infant safety carrier in which an infant may safely be transported in a vehicle and protected from injury in the event of abrupt acceleration or deceleration in a collision or upset of the vehicle.

BACKGROUND OF THE INVENTION

FIGS. 1 and 2 of the drawings show a prior art infant safety carrier. The carrier comprises a substantially rigid receptacle 1 of a size and shape suitable for containing the infant 7 and open at the top. The infant is held in the receptacle 1 by a restraint belt 2. The receptacle is placed crosswise of the vehicle on the seat 4 and held in place up against the seat back 5 by a belt 6 that embraces the end and front walls of the receptacle, is held in position by retaining bars 3 and includes a buckle 8.

The use of a belt 2 to hold the infant 7 in place in the receptacle, even if the inside of the receptacle is padded to absorb energy should parts of the infant's body impact in a collision, is inadequate in cases of relatively serious collisions or rollovers, and serious injury can be done to the infant in such cases because the belt 2 does not adequately restrain the infant. In a rollover type of collision, there is a great risk that the infant will be dislodged partly or wholly from the belt, and his or her chances of survival in such cases are poor. A less serious problem with the prior art carrier shown in FIGS. 1 and 2, but one that is nonetheless significant, is the lack of adequate ventilation within the receptacle 1 which can contribute greatly to the infant's discomfort and in prolonged journeys can be hazardous to his or her health. The prior art carrier also requires a special belt 6 inasmuch as the standard lap belt in the rear seats of automobiles and other vehicles is not long enough to embrace the receptacle 1.

SUMMARY OF THE INVENTION

There is provided, in accordance with the present invention, an improved infant safety carrier in which an infant is much more safely restrained within a receptacle fastened in place on the vehicle seat. Like the prior art carrier shown in FIG. 1 and other available carriers for infants, a carrier, according to the present invention, includes a substantially rigid receptacle that has a generally rectangular bottom, a pair of longer side walls and at least one relatively shorter end wall. The carrier receptacle is adapted to be placed crosswise of the vehicle on the seat and fastened in place by a restraint belt.

The present invention is characterized in that a bag made of durable, flexible material is fastened in the receptacle; the bag is shaped and dimensioned to envelope an infant's body and head, except for his or her face, thus providing restraint to virtually all parts of the infant's body and restraining the infant safely in the receptacle in the event of an accident. The bag has a lengthwise, releasable closure, preferably a zipper, that permits it to be opened up to receive the infant and closed for use.

The carrier receptacle preferably has a large ventilation window in at least one of the side walls, and a strong net is stretched across the window. The net absorbs the energy of an impact of any part of the infant's body that may be thrown against it in a crash. The net also, of course, allows air to circulate readily into the receptacle for the greater comfort of the infant. Thus, the net over the window provides the dual advantages of improved safety of the carrier and greater comfort of the occupant.

An optional but desirable part of the carrier is another strong net stretched across the top of the receptacle. Such a net can be slidably joined, such as by clips received in tracks along the upper edges of the side walls, so that the top net can be drawn back easily to permit the infant to be placed in the carrier and taken out of it, or it can be permanently fastened and have a zippered opening.

A pair of strong rings fastened to the side wall of the receptacle nearest the seat back receive a conventional rear seat lap belt for anchoring the carrier in place on the seat. Preferably the rings are located at a height on the side wall at approximately the level of the center of gravity of the carrier with the infant in it. Such an arrangement best ensures that any impact of any part of the infant's body against the receptacle will be against the front wall of the receptacle, and particularly the net over the ventilation window. The tendency for the carrier to lift or plunge or rotate about a lengthwise axis is greatly reduced, as compared to other possible locations for the retaining rings.

For a better understanding of the invention and a description of other preferred features and advantages, reference may be made to the following description of exemplary embodiments, taken in conjunction with the figures of the accompanying drawings.

DESCRIPTION OF THE DRAWINGS

FIG. 5 is a pictorial view of the bottom of the carrier shown in FIG. 1;

FIG. 6 is an end view showing the carrier of FIG. 1 in place on a vehicle seat;

FIG. 7 is a pictorial view of a second embodiment of the present invention;

FIGS. 8a through 8h are pictorial views of the principal components of the embodiment shown in FIG. 7, as follows:
    8a, the receptacle;
    8b, the energy-absorbing liner for the receptacle;
    8c, the metal reinforcing frame fitted around the top edge of the receptacle walls;
    8d the frame for the window net;
    8e, the retainer for holding the window net in the frame;
    8f, the window net;
    8g, the infant bag; and
    8h, the belt ring;

FIG. 9 is a partial, cross-sectional view of an end wall of the embodiment shown in FIG. 7, as indicated by the lines 9—9 in FIG. 7;

FIG. 10 is a partial, cross-sectional view of a side wall of the carrier, as indicated by the lines 10—10 in FIG. 7;

FIG. 11 is an end cross-sectional view of a ventilation window net as assembled on the frame;

FIG. 12 is an end cross-sectional view of the carrier shown in FIGS. 7 to 11 in position on a vehicle seat;

FIG. 13 is a pictorial view of an optional top retaining net for a carrier, and

FIG. 14 is a pictorial view of another top retaining net.

DESCRIPTION OF EXEMPLARY EMBODIMENTS

Figure 3:
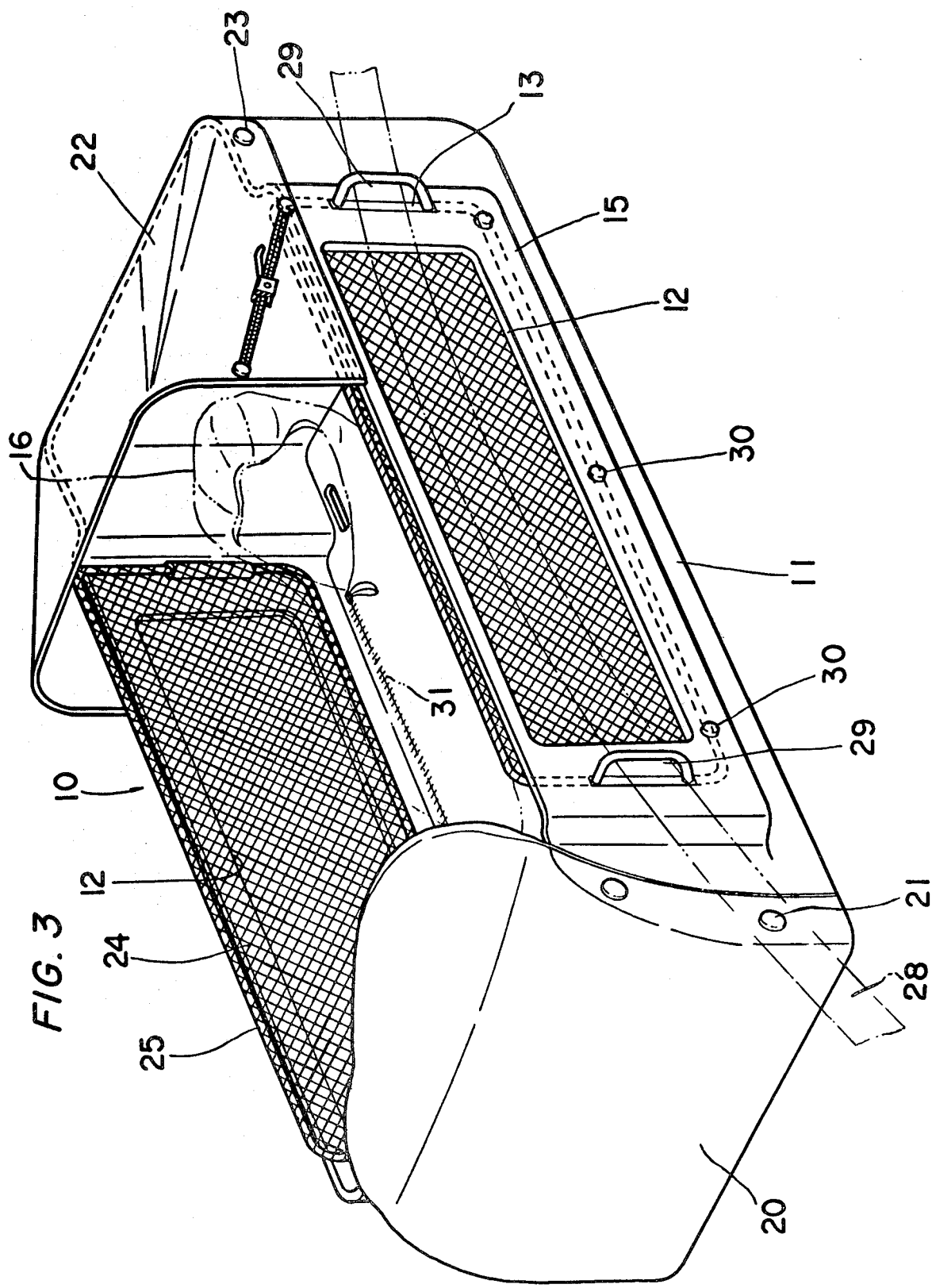
FIG. 3 is a pictorial view of one embodiment of the present invention.
Figure 4A:
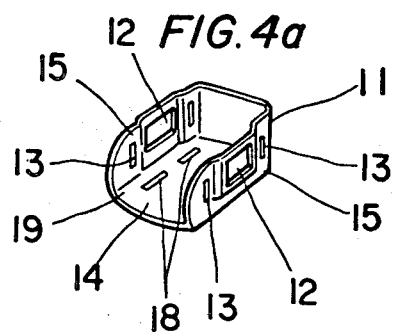
FIGS. 4a through 4f are pictorial views of the major components of the carrier shown in FIG. 1, as follows:
    4a, the receptacle;
    4b, the end wall for the receptacle;
    4c, the sunshade;
    4d, the combination window frame and belt ring;
    4e, the net for the ventilation window; and
    4f, the infant bag.
Figure 4D:
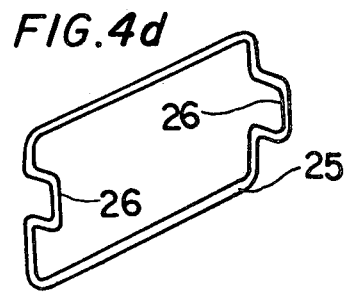
Figure 4B:
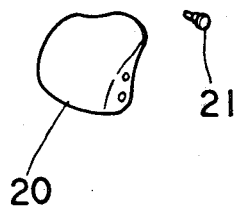
Figure 4E:
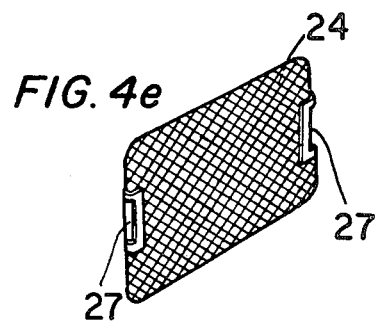
Figure 4C:
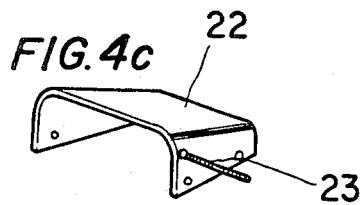
Figure 4F:
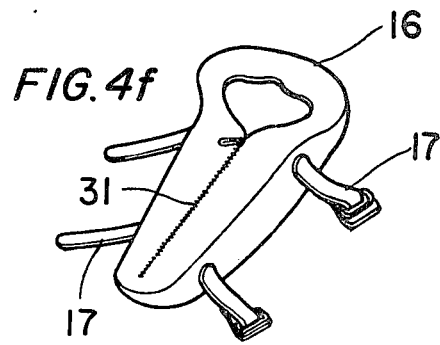

The infant safety carrier 10 shown in FIGS. 3 to 6 of the drawings comprises a receptacle 11 which is preferably molded from a high-impact strength plastic and comprises a generally rectangular bottom 14, a pair of side walls 15 and an end wall, the other end 19 being open. Each of the side walls 15 has a ventilation window 12 and a pair of slots 13 on either side of the window. The bottom has two pairs of slots 18. The open end 19 of the receptacle 11 is fitted with a separate closure 20 that is fastened to the side walls 15 by fasteners 21. An optional but desirable component of the receptacle is a sunshade 22 which pivots about pivot pins 23 between a closed position where it will shade the infant's head and upper body from the sun, as shown in FIG. 3, and an open position in which it swings up and to the rear to facilitate putting the infant into and taking the infant out of the carrier.

Each of the ventilation windows 12 in the side walls of the receptacle receives a strong net 24 made of nylon that is stretched over and suitably fastened to a frame 25. The frame includes U-shaped projections 26 that pass through openings 27 in the net 24 and then out through the slots 13 in the respective side walls 15 of the receptacle 11. The frame 25 is fastened in place on the receptacle walls by fasteners 30. As shown in FIG. 6, the carrier 10 is placed on the vehicle seat 32 crosswise of the vehicle up against the seat back 33, and the occupant restraint belt 28 is passed through the openings 29 (see also FIG. 3) formed by the projections 26 on the frame 25.

The infant is safely restrained within the receptacle 11 by a bag 16 of a size and shape which comfortably embraces all of his or her body except the head. An easily releasable closure, such as a zipper 31, extends from the foot end of the bag to the head opening. When the zipper is opened, the infant can be easily placed in the bag, and the zipper is then closed to hold him or her comfortably in place. Two strong straps 17 with buckles are sewn to the bag 16, one near the foot of the bag and the other near the head, and the straps 17 are passed through the respective two pairs of openings 18 (see FIG. 5) and the buckles fastened on the underside of the bottom 14 to secure the bag to the receptacle 11.

Preferably, the openings 29 defined by the projections 26 on the window frame 25 through which the vehicle occupant restraint belt 28 passes are located at approximately the same height above the bottom 14 of the receptacle as the center of gravity of the carrier with the infant in place. Accordingly, in the event of a front-end collision of the vehicle, the tendency for the carrier 10 to be lifted off the seat by forward and upward rotation relative to the places where the belt 28 engages the projections 26 is minimized. Similarly, the tendency for the carrier to plunge into the seat and fly forward is minimized with this arrangement. The direction of acceleration due to inertia acting at the center of gravity of the carrier is generally aligned with the resisting force of the belt acting on the projections 26.

Figure 1:
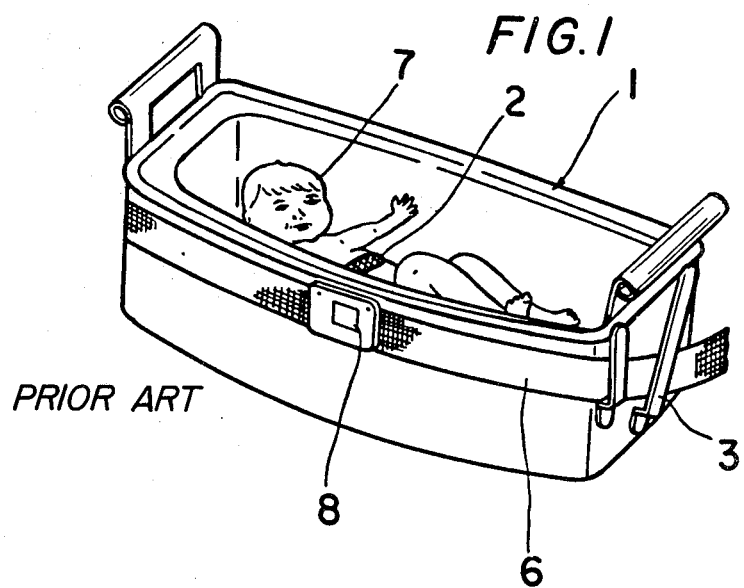
FIG. 1 is a pictorial view of a prior art infant safety carrier.
Figure 2:
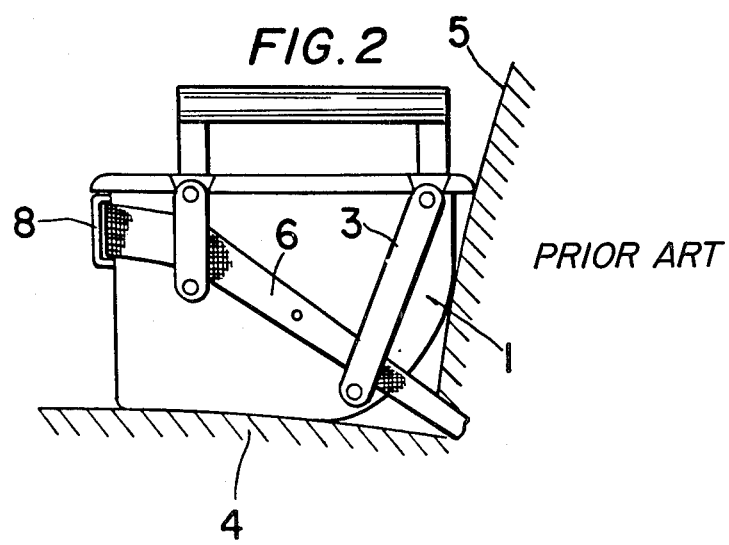
FIG. 2 is an end view of the carrier shown in FIG. 1.

In any collision or upset, the vehicle restraint belt 28 restrains the carrier and the carrier, in turn, restrains the infant. The bag 16 keeps the infant's arms, legs and head from being thrown about violently and provides excellent protection from injury. The forces exerted by the bag on the infant are widely spread over the parts of his or her body, and the advantage of the present invention is considerable compared to the high forces on and violent motions of the infant's body produced and afforded by a restraint belt of the prior art type shown in FIGS. 1 and 2. In instances in which the vehicle overturns, the bag 16 reasonably comfortably and safely holds the infant like a hammock and keeps the infant from being subjected to large forces and uncomfortable and possibly injurious postures or perhaps being entirely dislodged from the carrier.

The ventilation windows, especially the one facing the front of the vehicle, permit air to circulate into the receptacle and make the infant much more comfortable. The bag 16 can be manufactured from a permeable fabric or a fine mesh netting for even better comfort. Also, the nettings stretched over the window are capable of absorbing the energy of an impact of any part of the infant that might be thrown against the window in a violent crash.

The carrier shown in FIGS. 7 to 12 comprises a receptacle 34 having a substantially rectangular bottom 37, side walls 35, each of which has a ventilation window 36, and end walls. Two pairs of slots 40 are formed in the bottom 37 to receive the belts 39 by which the bag 38 is secured in the carrier. The receptacle 34 receives an energy-absorbing liner 41 made of a flexible foam, such as polyurethane, and shaped to nest within the receptacle. The liner 41 has, of course, openings 42 which register with the windows 36 in the receptacle and slots in the bottom 43 which register with the slots 40 in the bottom of the receptacle. A rectangular peripheral frame 49 fits around the top edge of the side and end walls of the receptacle 34 (see FIG. 9) and contributes strength and rigidity to the receptacle.

Each ventilation window 36 receives a net 44 that is stretched over a frame 46 and held in place in grooves 47 formed in the frame by means of a steel retainer rod 48 which fits tightly into the grooves 47 (see FIG. 11). When the net is placed over the frame and the retainer rod 48 is pressed into the receiving groove, the net is automatically stretched tightly and is able to absorb energy in the event any part of the infant may impact against it. As shown in FIG. 10, the net assembly fits in grooves 45 in the energy-absorbing liner 41 between the side walls 35 of the receptacle 34 and the side walls of the liner.

As shown in FIG. 12, the present embodiment is placed crosswise of the vehicle and rests on the bottom 53 of the vehicle seat and is held down and against the back 54 of the seat by the vehicle occupant restraint belt 50 which passes through two rings 51 fastened to the carrier by fasteners 52 (see FIG. 7). Like the first embodiment, the present embodiment is used by opening the zipper 55 and placing the infant in the bag 38. The bag retains the infant comfortably restrained with any forces exerted on his body in a crash spread in a noninjurious manner over a great area of the body. Should any parts of the infant's body be thrown against any walls of the receptacle, the impact is cushioned by the liner 41, and if the infant should come in contact with a window, the net 44 absorbs the energy. The windows also allow ventilation for improved comfort. Accordingly, all of the features of the first embodiment are included within the second embodiment.

FIG. 13 illustrates an additional feature which might be included in a carrier embodying the present invention. Rails 58 are installed along the upper edges of the side walls of the receptacle and a top net 56 is stretched between the rails and connected to them by sliders. Accordingly, the top net can be drawn from a closed position (as shown) to an open position by sliding one end toward the other. Instead of using rails and a slider to retain a top net that can be opened and closed easily, a net 57 having a zipper 59, as shown in FIG. 14, can be stretched over and suitably fastened to the top of the receptacle. The top nets provide additional assurance that the infant will be retained in the carrier in the event of an accident.

The above-described embodiments are merely exemplary and may readily be modified without departing from the scope of the present invention, as defined in the appended claims.

I claim:

1. An infant safety carrier for vehicles having a substantially rigid receptacle that has a generally rectangular bottom, a pair of side walls and at least one end wall and is adapted to be placed crosswise of the vehicle on the seat and fastened in place by a vehicle safety belt characterized in that there is a bag of strong flexible material fastened in the receptacle, the bag being shaped and dimensioned to envelop an infant's body and head, except for his or her face, thus to retain the infant safely in the receptacle in the event of an accident, and having a lengthwise releasable closure which permits it to be opened to receive the infant, and further characterized in that there is a pair of strong rings fastened to the side wall of the receptacle nearest the vehicle seat back, the rings being adapted to accept the vehicle belt and being located at about the same height on the receptacle as the center of gravity of the carrier with an infant received therein.

2. An infant safety carrier according to claim 1 and further characterized in that the receptacle has a ventilation window in at least one of the side walls, and there is a strong net stretched across the window for absorbing energy in the event of impact of part of the infant's body against the net.

3. An infant carrier for vehicles having a substantially rigid receptacle that has a generally rectangular bottom, a pair of side walls and at least one end wall and is shaped to be placed crosswise of the vehicle on the seat and fastened in place by a vehicle safety belt characterized in that there is a bag of strong flexible material fastened in the receptacle by two strong straps, one near the foot of the bag and the other near the head of the bag, each strap being passed through a respective pair of openings in the bottom of the receptacle, the bag being shaped and dimensioned to envelop an infant's body and head, except for his or her face, thus to retain the infant safely in the receptacle in the event of an accident, and having a lengthwise releasable closure which permits it to be opened to receive the infant, and further characterized in that there is a pair of strong rings fastened to the side wall of the receptacle nearest the vehicle seat back, the rings being adapted to accept the vehicle belt and being located at about the same height on the receptacle as the center of gravity of the carrier with an infant received therein.

4. An infant safety carrier according to claims 1, 2 or 3 and further characterized in that there is a strong netting stretched across the top of the receptacle, the netting being releasably joined to the upper edges of the walls of the receptacle so that it can be opened.

5. An infant safety carrier according to claims 1, 2 or 3 and further characterized in that there is an energy-absorbing liner received in the receptacle and lining the bottom, the side walls and at least one end wall.

* * * * *